(12) United States Patent
Gerendas

(10) Patent No.: US 11,073,072 B2
(45) Date of Patent: Jul. 27, 2021

(54) COMBUSTION CHAMBER ASSEMBLY WITH ADAPTED MIXED AIR HOLES

(71) Applicant: Rolls-Royce Deutschland Ltd & Co KG, Blankenfelde-Mahlow (DE)

(72) Inventor: Miklos Gerendas, Am Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 16/723,240

(22) Filed: Dec. 20, 2019

(65) Prior Publication Data

US 2020/0200069 A1 Jun. 25, 2020

(30) Foreign Application Priority Data

Dec. 21, 2018 (DE) .................... 10 2018 222 897.3

(51) Int. Cl.
*F23R 3/06* (2006.01)
*F02B 23/10* (2006.01)
(Continued)

(52) U.S. Cl.
CPC ............ *F02B 23/101* (2013.01); *F02C 7/266* (2013.01); *F02B 1/04* (2013.01); *F02B 2075/125* (2013.01); *F02M 57/06* (2013.01); *F02P 13/00* (2013.01); *F23D 2207/00* (2013.01); *F23R 3/06* (2013.01); *F23R 2900/00012* (2013.01); *H01T 13/08* (2013.01)

(58) Field of Classification Search
CPC .. F23R 3/06; F23R 2900/00012; Y02T 50/60; F02B 23/101; F02B 1/04; F02B 2075/125; F02C 7/266; F02M 57/06; F02P 13/00; F23D 2207/00; H01T 13/08
See application file for complete search history.

(56) References Cited

U.S. PATENT DOCUMENTS 6,205,789 B1 * 3/2001 Patterson ................ F23R 3/002
 60/754
6,266,961 B1 * 7/2001 Howell .................... F23R 3/06
 60/752

(Continued)

FOREIGN PATENT DOCUMENTS

FR 2973479 A1 10/2012

OTHER PUBLICATIONS

German Search Report dated Sep. 6, 2019 from counterpart German Patent Application No. 10 2018 222 897.3.

*Primary Examiner* — Hai H Huynh
*Assistant Examiner* — Gonzalo Laguarda
(74) *Attorney, Agent, or Firm* — Shuttleworth & Ingersoll, PLC; Timothy Klima

(57) ABSTRACT

The proposed solution relates to a combustion chamber assembly of an engine (T), in which an overrun of a spark plug is defined with a specific outer cone and a specific inner cone, and mixing air holes of a first arrangement and of at least one second arrangement that lie at least partially in a partial region of the overrun of the spark plug, said overrun being defined by the outer cone and the inner cone and extending downstream of the spark plug as far as an inner apex point (Si) of the inner cone, are formed with a flow cross section which is different from a flow cross section which the mixing air holes adjoining in the circumferential direction (U) of the respective arrangement have.

13 Claims, 13 Drawing Sheets

(51) Int. Cl.
   *F02C 7/266*   (2006.01)
   *F02B 1/04*    (2006.01)
   *F02P 13/00*   (2006.01)
   *F02B 75/12*   (2006.01)
   *H01T 13/08*   (2006.01)
   *F02M 57/06*   (2006.01)

(56) References Cited

U.S. PATENT DOCUMENTS

| | | | |
|---|---|---|---|
| 9,080,771 B2* | 7/2015 | Bunel | F23R 3/06 |
| 10,712,006 B2* | 7/2020 | Clemen | F23R 3/10 |
| 2011/0219774 A1 | 9/2011 | Bronson et al. | |
| 2012/0186222 A1* | 7/2012 | Commaret | F23R 3/06 |
| | | | 60/39.827 |

* cited by examiner

State of the Art

State of the Art

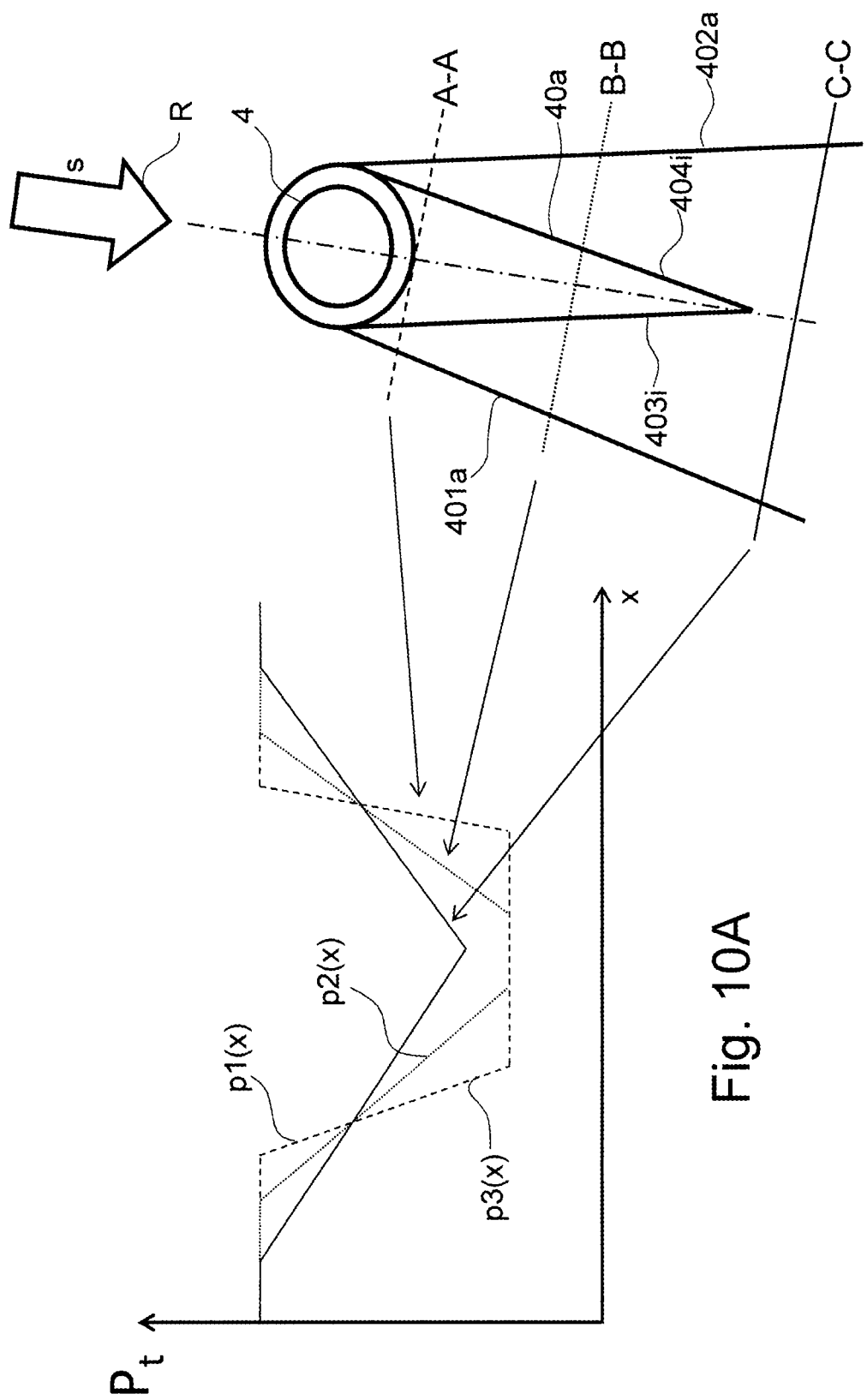

COMBUSTION CHAMBER ASSEMBLY WITH ADAPTED MIXED AIR HOLES

This application claims priority to German Patent Application DE102018222897.3 filed Dec. 21, 2018, the entirety of which is incorporated by reference herein.

The proposed solution relates to a combustion chamber assembly of an engine and to a method for producing a combustion chamber assembly.

A combustion chamber assembly of the type in question has a combustion chamber, the combustion chamber wall of which bounds a combustion space. A plurality of mixing air holes for supplying mixing air into the combustion space are provided on the combustion chamber wall. Furthermore, at least one spark plug is fixed at an access hole of the combustion chamber wall and projects through the access hole into the combustion space. During operation of the engine, an air flow with mixing air flows along the combustion chamber wall toward the mixing air holes and thus enters the combustion space via the mixing air holes. The mixing air holes are customarily provided here on the combustion chamber wall in repeating patterns and also here in sectors of the combustion chamber, at which sectors one of optionally a plurality of spark plugs is fixed. In larger engines, the access hole in the combustion chamber wall for a spark plug is customarily formed with a spark plug tower and sealed with a seal provided thereon. In smaller engines, the access hole is not sealed and a leakage gap which is open annularly arises around the spark plug.

Modifications of the region with the access hole and the spark plug in comparison to the regions of the combustion chamber wall without spark plugs, in order to enrich a fuel-air mixture in the region of the spark plug or to increase a primary zone volume so that the ignitability is increased, in particular at high flight altitudes, are known from the prior art. A corresponding increase in the primary zone volume for increasing the ignitability is revealed, for example, in US 2012/0186222 A1.

A sealed spark plug tower provided on the combustion chamber wall is an additional barrier in the outer annulus of the combustion chamber and leads to a deterioration in the air supply to the mixing air holes in that sector of the combustion chamber which has the spark plugs. A corresponding sector is therefore also even hotter at the exit than all of the other sectors. The correspondingly increased temperature has to be taken into consideration in the configuration of the turbine cooling. Since spark plug towers are used above all in large engines which at the same time also have a higher average combustion chamber exit temperature, this deviation or increase in the temperature is of significant consequence.

An open annular leakage gap in smaller engines leads in turn to an additional air supply in the sector with the spark plug. A corresponding sector even at the end of the combustion chamber is therefore colder than other (spark-plug-free) sectors. A fuel-air ratio in a sector with a spark plug is thus leaner than in other (spark-plug-free) sectors of the combustion chamber. A lower flame stability has therefore been observed in a sector with a spark plug although here on the contrary a higher stability would be needed than in the other sectors, in order to reliably ignite the fuel-air mixture in a sector with a spark plug.

It is therefore an object of the proposed solution to provide a combustion chamber assembly which is improved in this respect for an engine.

This object is achieved both with a combustion chamber assembly and also with a production method according to the present disclosure.

A proposed combustion chamber assembly of an engine here comprises a combustion chamber, the combustion chamber wall of which bounds a combustion space, wherein a plurality of mixing air holes for supplying mixing air into the combustion space are provided on the combustion chamber wall. At least one spark plug is fixed at an access hole of the combustion chamber wall and projects through the access hole into the combustion space. During the operation of the engine, an air flow flows along the combustion chamber wall in a flow direction toward the mixing air holes, of which at least a part is provided downstream of the access hole for the at least one spark plug. A first arrangement of mixing air holes present next to one another in a circumferential direction is provided. Furthermore, a second arrangement of mixing air holes lying next to one another in the circumferential direction is provided, said second arrangement being provided downstream with respect to the flow direction of the first arrangement of mixing air holes. The mixing air holes which are each assigned to a certain arrangement, customarily a row of mixing air holes, frequently have identical flow cross sections, it being possible for the flow cross sections of mixing air holes of different arrangements to differ from one another. For example, a first row of mixing air holes has a smaller flow cross section than a second arrangement of mixing air holes following the latter in the flow direction.

Within the scope of the proposed solution, it is now additionally provided that at least one mixing air hole lying downstream of a spark plug has a modified flow cross section in relation to a respective arrangement to which the at least one mixing air hole is assigned, in order to compensate for the influence on the temperature profile at the end of the combustion chamber because of the provision of the spark plug on the combustion chamber wall and very substantially to standardize a fuel-air ratio over all regions of the combustion space with and without spark plugs. To this end, the proposed solution provides a definition for an overrun of the spark plugs with an outer cone and an inner cone, wherein the outer cone is predetermined in a cross section parallel to the flow direction and through the access hole by two outer edges which intersect at an outer apex point of the outer cone upstream of the spark plug, in each case run at a (first overrun) angle in the range of 8° to 12°, in particular 10°, to the flow direction and are at a tangent to an outer circumference of the spark plugs, and the inner cone is predetermined in the same cross section by two inner edges which intersect at an inner apex point of the inner cone downstream of the spark plug, in each case run at a (second overrun) angle in the range of 8° to 12°, in particular 10°, to the flow direction and are at a tangent to an outer circumference of the spark plugs at the same two contact points as the outer edges of the outer cone.

The inner and outer edges of the inner and outer cones of the overrun therefore define, in a cross-sectional view, a parallelogram with the two contact points and the inner and outer apex points as corner points of the parallelogram, in the center of which the peripheral line of the spark plugs lies.

Mixing air holes, provided downstream of the spark plug, of the first arrangement and of the at least one second arrangement that lie at least partially in a partial region of the overrun of the spark plugs, said overrun being defined by the outer cone and the inner cone and extending downstream of the spark plug as far as the inner apex point, are formed here with a flow cross section which is different from a flow cross section which the mixing air holes adjoining in the circumferential direction of the respective arrangement have. Therefore, if a mixing air hole of the first and/or of the second arrangement is at least partially present in the partial region of the spark-plug overrun defined via the outer cone and the inner cone, the corresponding mixing air hole has a modified flow cross section. The proposed solution expressly also includes the fact here that optionally also only one mixing air hole of one of the two arrangements is present in the partial region of the overrun. The respective mixing air hole can in principle lie here completely or else partially within the defined partial region of the overrun. Mixing air holes are therefore in particular included which, in a cross-sectional view of the lateral surface of the outer cone and/or of the inner cone and consequently in a cross-sectional view parallel to the flow direction and through the access hole of the spark plug, are intersected by at least one of the outer or inner edges.

It thus turned out that, by means of specifically changed flow cross sections precisely in the spark-plug overrun specifically defined according to the proposed solution, identical quantities of mixing air as in spark-plug-free regions of the combustion space can be achieved within the combustion space even in the region of the spark plug. By this means, identical fuel-air ratios can be specifically achieved within the combustion space, irrespective of whether a spark plug is present or is not present on the combustion chamber wall. The selected definition of the overrun of the spark plug ensures that a flow cross section (and therefore typically a diameter of a mixing air hole) is also adapted irrespective of the association of a mixing air hole with one of optionally a plurality of different combustion sectors of the combustion chamber. The flow cross section is therefore adapted only depending on whether the respective mixing air hole can be assigned to the spark-plug overrun defined in such a manner, or not.

In one variant embodiment, a plurality of rows of mixing air holes, each extending in the circumferential direction, are provided downstream of the access hole for the spark plug. In this case, the mixing air holes of a row can each have identical flow cross sections and only the mixing air holes lying at least partially in the partial region of the spark-plug overrun defined according to the proposed solution are formed with a modified flow cross section and consequently with a larger or smaller flow cross section.

In principle, the flow cross section of the mixing air holes at least partially lying in the partial region of the overrun can be increased or reduced in relation to the mixing air holes of the respective arrangement, specifically depending on whether the access hole of the spark plug is sealed by at least one seal or whether there is a leakage gap between an inner lateral surface of the access hole and the spark plugs. At least one mixing air hole lying at least partially in the partial region of the overrun is therefore increased in size or reduced in size in relation to the mixing air holes of its arrangement, depending on whether the provision of the spark plug in the region of the access hole means that there is only a reduced approach flow or more mixing air (via the leakage gap).

In this connection, a respective increase in size or reduction in size of the mixing air hole lying at least in the partial region of the overrun can be, for example, a certain percentage in relation to the mixing air holes of the respective arrangement. For example, a flow cross section of a mixing air hole lying at least partially in the defined spark-plug overrun can then be increased or reduced between 10% and 100%, in particular between 33% and 100%, for example between 50% and 100%, in particular between 75% and 100% or between 10% and 50%, in particular between 33% and 50%, in particular depending on whether the respective mixing air hole is intersected by an inner edge of the inner cone or by an outer edge of the outer cone of the overrun. A 100% compensation can be defined here, for example, by the area of the leakage gap between spark plug and combustion chamber wall (if a reduction in size of the mixing air holes is provided in the overrun), or by the portion of the cross-sectional area of the spark plug present in a sealed access hole—and in a possibly present spark plug tower—at the overall flow area in the outer annulus between combustion chamber and a housing accommodating the combustion chamber (if an increase in size of the mixing air holes is provided in the overrun).

For example, the degree of the increase in size or reduction in size of the mixing air hole which is at least partially present in the partial region of the overrun is dependent on the mixing air quantity to be compensated for and on a cross-sectional area to be compensated for (the flow passes through to a lesser or greater extent).

In the event of a leakage through a non-sealed leakage gap, full compensation is understood as meaning, for example, that compensation at which the at least one mixing air hole in the spark-plug overrun is reduced in cross-sectional area by the entire cross-sectional area of the leakage gap. In the event of blocking of the flow (and therefore blocking in the outer annulus of the combustion chamber) by a spark plug present in a sealed access hole and an optionally present spark plug tower (with seal), full compensation is understood as meaning that compensation at which the at least one mixing air hole in the spark-plug overrun is increased in size by the portion of the cross-sectional area that corresponds to the portion of the cross-sectional area of spark plug (and optionally spark-plug tower or seal) at the entire area of the outer annulus between combustion chamber and housing accommodating the combustion chamber in a burner sector. If the spark plug (with its spark plug tower) blocks, for example, 20% of the annulus in a burner sector, then, for full compensation, the mixing air hole in the overrun defined as proposed would be increased in its cross-sectional area by up to 20%.

In a variant based thereon, it is provided, for example, that, when a spark plug is provided in a sealed access hole (with spark-plug tower), a flow cross section of at least one mixing air hole present in the partial region of the overrun is increased in such a manner that, by means of the increased flow cross section, it is possible to compensate for between 10% and 100%, in particular between 33% and 100%, of a quantity of mixing air by which a mixing air flow is reduced in the region of the sealed access hole in relation to regions of the combustion chamber wall adjoining in the circumferential direction without a spark plug. The at least one mixing air hole present in the partial region of the overrun therefore compensates, by means of its enlarged cross section, at least partially for a local blockade of the approach flow, which blockade is provided by the spark plug. Then, while maintaining a hole center point of the respective mixing air hole, a diameter can be adapted and the corresponding blockade in the overrun of the spark plug can be compensated for in a specific manner. This includes in particular the fact that, when a spark plug is provided in a sealed access hole (with spark-plug tower), a flow cross section of at least one mixing air hole present in the partial region of the overrun is increased in such a manner that, by means of the increased flow cross section, it is possible to compensate for between 10% and 100%, in particular between 33% and 100%, of a cross-sectional area through which less flow passes because of the spark plug present in a sealed access hole. This is considered to be a measure of how much the flow through the mixing air hole lying in the overrun of the spark plug is reduced in relation to those regions of the combustion chamber wall which are adjacent in the circumferential direction without a spark plug.

In this connection, a flow cross section of a mixing air hole which at least partially lies in the partial region of the overrun and is intersected by at least one inner edge of the inner cone of the overrun can be greater than a flow cross section of a mixing air hole which at least partially lies in the partial region of the overrun and is intersected by at least one outer edge of the outer cone of the overrun. A change in the flow cross section therefore depends on in which section of the partial region of the overrun the respective mixing air hole is present and the extent to which the respective mixing air hole is swept over by the partial region of the overrun.

In one variant embodiment, a flow cross section of a mixing air hole which at least partially lies in the partial region of the overrun and is intersected by at least one inner edge of the inner cone of the overrun is increased in such a manner that, by means of the increased flow cross section, it is possible to compensate for between 50% and 100%, in particular between 75% and 100%, of a quantity of mixing air by which a mixing air flow is reduced in the region of the sealed access hole in relation to regions of the combustion chamber wall adjoining in the circumferential direction without a spark plug. The flow cross section of the mixing air hole that at least partially lies in the inner section (defined by the inner cone) of the partial region of the overrun is therefore increased specifically by a defined extent in order to compensate again to a predominant amount for the blockade of the air flow in the region of the spark plug. This variant therefore also again includes the fact that the flow cross section of a mixing air hole is increased in such a manner that, by means of the increased flow cross section, it is possible to compensate for between 50% and 100%, in particular between 75% and 100%, of a cross-sectional area through which less flow passes because of the spark plug present in a sealed access hole in an outer annulus of the combustion chamber.

Alternatively or additionally, a flow cross section of a mixing air hole which at least partially lies in the partial region of the overrun and is intersected by at least one outer edge of the outer cone of the overrun may be increased in such a manner that, by means of the increased flow cross section, it is possible to compensate for between 10% and 50%, in particular between 33% and 50%, of a quantity of mixing air by which a mixing air flow is reduced in the region of the sealed access hole in relation to regions of the combustion chamber wall adjoining in the circumferential direction without a spark plug (i.e. in particular between 33% and 50% of the cross-sectional area blocked in the outer annulus can be compensated for). Consequently, because of the flow cross section, which is increased by a certain amount, of a mixing air hole lying at least partially in the outer section (defined by the outer cone) of the partial region of the overrun, an additional quantity of mixing air also passes here into the combustion space in order to compensate for the obstacle, formed by the spark plug, in the flow path of the approach flow. However, in the case of a mixing air hole present in an outer section of the partial region of the overrun, in terms of percentage only a smaller compensation for, and therefore increase in, the flow cross section is provided than in the case of a mixing air hole which lies at least partially in an inner section of the partial region of the overrun since the strength of the negative effect of the overrun of the spark plug drops slowly at an increasing axial distance (in the flow direction with residual swirl) from the spark plug and quite rapidly perpendicularly thereto (in the circumferential direction, if without residual swirl), and therefore has to be compensated for less. The flow introduced through the spark plug and a possibly present spark-plug tower can also be understood here as a local deficit in the total pressure of the flow in the outer annulus. The difference of the total pressure in the annulus to the static pressure in the combustion chamber constitutes the driving pressure gradient for the flow through the mixing air holes. In this connection, the outer cone is the region in which a disturbance is generally present, but states little about the strength of said disturbance. The inner cone with a limited axial extent (in the flow direction) is the region of the disturbance in which the latter maintains its strength constantly. Only after the end of the core region of the overrun is the deficit thereof in the total pressure topped up again and therefore the total pressure increases on the axis of the overrun as the running length increases.

When a spark plug is provided with a leakage gap in an access hole, for the proposed mixing air compensation no increase, but rather a reduction of a flow cross section of at least one mixing air hole present in the partial region of the spark-plug overrun is provided. In this case, the above-explained numerical percentage ranges may apply correspondingly for a reduction of the flow cross section.

For example, when a spark plug is provided with a leakage gap in an access hole, a flow cross section of at least one mixing air hole present in the partial region of the overrun is reduced in such a manner that, by means of the reduced flow cross section, it is possible to compensate for between 10% and 100%, in particular between 33% and 100%, of a quantity of mixing air which flows excessively through the leakage gap into the combustion space. Mixing air which could ultimately lead to thinning of the fuel-air mixture in the region of the spark plug is consequently compensated for here in a specific manner by a reduction in a flow cross section of a mixing air hole located in the overrun or of a plurality of mixing air holes located in the overrun.

In accordance with the above-explained examples, therefore, for example, a flow cross section of a mixing air hole which at least partially lies in the partial region of the overrun and is intersected by at least one inner edge of the inner cone of the overrun may be smaller than a flow cross section of a mixing air hole which at least partially lies in the partial region of the overrun and is intersected by at least one outer edge of the outer cone of the overrun.

Alternatively or additionally, a flow cross section of a mixing air hole which at least partially lies in the partial region of the overrun and is intersected by at least one inner edge of the inner cone of the overrun may be reduced in such a manner that, by means of the reduced flow cross section, it is possible to compensate for between 50% and 100%, in particular between 75% and 100%, of a quantity of mixing air which flows (excessively) through the leakage gap into the combustion space.

Alternatively or additionally, a flow cross section of a mixing air hole which at least partially lies in the partial region of the overrun and is intersected by at least one outer edge of the outer cone of the overrun may be reduced in such a manner that, by means of the reduced flow cross section, it is possible to compensate for between 10% and 50%, in particular between 33% and 50%, of a quantity of mixing air which flows through the leakage gap into the combustion space.

Of course, in variant embodiments, it may also be that a plurality of mixing air holes (at least two) are present in the defined partial region, as proposed, of the spark-plug overrun, i.e. in the cross-sectional view are intersected by the inner edge of the inner cone and/or by the outer edge of the outer cone. In one variant embodiment, it is provided in this connection that the flow cross sections of a plurality of mixing air holes present in the partial region of the overrun are coordinated with one another in order—in particular depending on the position within the partial region—to compensate, in combination, for a blocked quantity of mixing air or a quantity of mixing air additionally flowing into the combustion space. If, for example, a first mixing air hole which is intersected by at least one inner edge of the inner cone of the overrun and a second mixing air hole which is intersected only by at least one outer edge of the outer cone of the overrun lie at least partially in the partial region of the overrun, the flow cross sections of the first and second mixing air holes differ. The flow cross section of the first (inner) mixing air hole—when the access hole is sealed—can be larger than, or—when there is a leakage gap at the access hole—can be smaller than, a flow cross section of the second (outer) mixing air hole. The degree of the increase or reduction of the flow cross section consequently depends on whether the respective mixing air hole is intersected by an inner edge or only by an outer edge and therefore lies further inward or further outward—with respect to the outer cone.

For example, when a spark plug is provided in a sealed access hole, the flow cross sections of the first and second mixing air holes are increased in such a manner that, by means of the increased flow cross sections, it is possible to compensate for in total between 75% and 100%, in particular between 90% and 100%, of a quantity of mixing air by which a mixing air flow is reduced in the region of the sealed access hole in relation to regions of the combustion chamber wall adjoining in the circumferential direction without a spark plug (i.e. in total between 75% and 100%, in particular between 90% and 100%, of the cross-sectional area blocked in the annulus can be compensated for). This includes, for example, the fact that, by means of the (more greatly) increased flow cross section of the first (inner) mixing air hole, it is possible to compensate for between 50% and 75%, in particular between 60% and 70%, of the quantity of mixing air, and by means of the (less greatly) increased flow cross section of the second (outer) mixing air hole, it is possible to compensate for between 10% and 50%, in particular between 25% and 40%, of the quantity of mixing air. The total of the quantity of mixing air which can be compensated for by the first and second mixing air holes always lies here between the previously stated 75% and 100%, in particular between 90% and 100%.

By contrast, when a spark plug is provided with a leakage gap in an access hole, the flow cross sections of the first and second mixing air holes may be reduced in such a manner that, by means of the reduced flow cross sections, it is possible to compensate for in total between 75% and 100%, in particular between 90% and 100%, of a quantity of mixing air which flows (excessively) through the leakage gap into the combustion space. This in turn includes the fact that, by means of the (more greatly) reduced flow cross section of the first (inner) mixing air hole, it is possible to compensate for between 50% and 75%, in particular between 60% and 70%, of the quantity of mixing air, and by means of the (less greatly) reduced flow cross section of the second (outer) mixing air hole, it is possible to compensate for between 10% and 50%, in particular between 25% and 40%, of the quantity of mixing air, wherein the total of the quantity of mixing air which can be compensated for by the first and second mixing air holes lies between 75% and 100%, in particular between 90% and 100%.

The proposed solution furthermore also relates to a method for producing a combustion chamber assembly of an engine.

The method in particular makes provision here for a combustion chamber wall to be provided for a combustion chamber for bounding a combustion space of the combustion chamber and for a plurality of mixing air holes for supplying mixing air to the combustion space to be provided on said combustion chamber wall. At least one access hole for a spark plug which is fixed at the access hole of the combustion chamber wall and projects through the access hole into the combustion space is provided on said combustion chamber wall. Analogously to the proposed combustion chamber assembly, an overrun of the spark plug is now defined with an outer cone and an inner cone. At least one mixing air hole which is located downstream of the spark plug in the defined partial region of the overrun is formed with a flow cross section which differs in relation to a flow cross section which the mixing air holes adjoining an arrangement in the circumferential direction have. A mixing air hole swept over by the partial region of the overrun is therefore modified in respect of its flow cross section in a specific manner in order to compensate in a defined manner for either a local mixing air loss occurring in the flow path along the combustion chamber wall because of a sealed access hole for the spark plugs and a blockade present due to a possible spark-plug tower, or a mixing air excess occurring because of a leakage gap at the access hole for the spark plugs.

Within the course of a proposed production method, a variant embodiment of a proposed combustion chamber assembly and an engine having such a combustion chamber assembly can be produced. Features and advantages explained above and below for variant embodiments of a proposed combustion chamber assembly consequently also apply to variant embodiments of a proposed production method, and vice versa.

In the figures:

FIG. 10A shows a pressure-travel diagram for illustrating the total pressure profile at three different regions in an overrun of the spark plug of FIG. 9A;

FIG. 10B shows, in an excerpt, the combustion chamber wall with the spark plug of FIG. 9A in a top view with an illustration of an overrun of the spark plug and of three sectional planes for the three total pressure profiles of FIG. 10A;

Figure 11A:
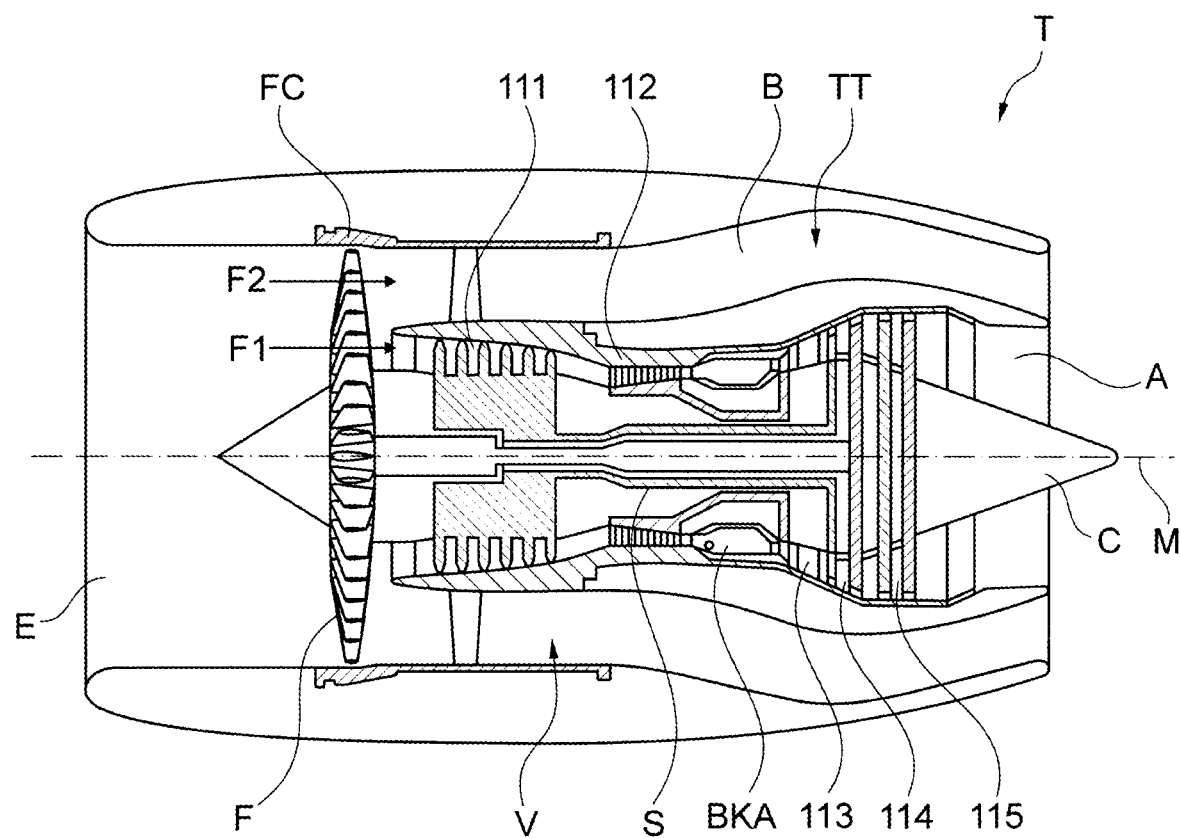
FIG. 11A shows an engine in which a combustion chamber assembly corresponding to one of FIGS. 1 to 10B is used.

FIG. 11A illustrates, schematically and in a sectional illustration, a (gas turbine) engine T, in which the individual engine components are arranged one behind the other along an axis of rotation or central axis M, and the engine T is formed as a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. Here, the turbine TT adjoins a compressor V, which comprises for example a low-pressure compressor 111 and a high-pressure compressor 112, and possibly also a medium-pressure compressor. The fan F on one side conducts air in a primary air flow F1 to the compressor V, and on the other side, to generate thrust, in a secondary air flow F2 to a secondary flow channel or bypass duct B. The bypass duct B here runs around a core engine comprising the compressor V and the turbine TT and comprising a primary flow channel for the air supplied to the core engine by the fan F.

The air conveyed into the primary flow channel by means of the compressor V passes into a combustion chamber portion BKA of the core engine, in which the drive energy for driving the turbine TT is generated. For this purpose, the turbine TT has a high-pressure turbine 113, a medium-pressure turbine 114 and a low-pressure turbine 115. Here, the energy released during the combustion is used by the turbine TT to drive the rotor shaft S and thus the fan F in order to generate the required thrust by means of the air conveyed into the bypass duct B. The air from the bypass duct B and the exhaust gases from the primary flow duct of the core engine flow out via an outlet A at the end of the engine T. In this arrangement, the outlet A generally has a thrust nozzle with a centrally arranged outlet cone C.

In principle, the fan F may also be coupled via a connecting shaft and an epicyclic planetary transmission to the low-pressure turbine 15, and be driven by the latter. It is furthermore also possible to provide other, differently designed gas turbine engines in which the proposed solution can be used. For example, such engines may have an alternative number of compressors and/or turbines and/or an alternative number of connecting shafts. As an example, the engine may have a split-flow nozzle, meaning that the flow through the bypass duct B has its own nozzle, which is separate from and situated radially outside the core engine nozzle. However, this is not limiting, and any aspect of the present disclosure may also apply to engines in which the flow through the bypass duct B and the flow through the core are mixed or combined before (or upstream of) a single nozzle, which may be referred to as a mixed-flow nozzle. One or both nozzles (whether mixed or split flow) may have a fixed or variable region. While the described example relates to a turbofan engine, the proposed solution may be applied, for example, to any type of gas turbine engine, such as an open-rotor (in which the fan stage is not surrounded by an engine nacelle) or turboprop engine, for example.

Figure 11B:
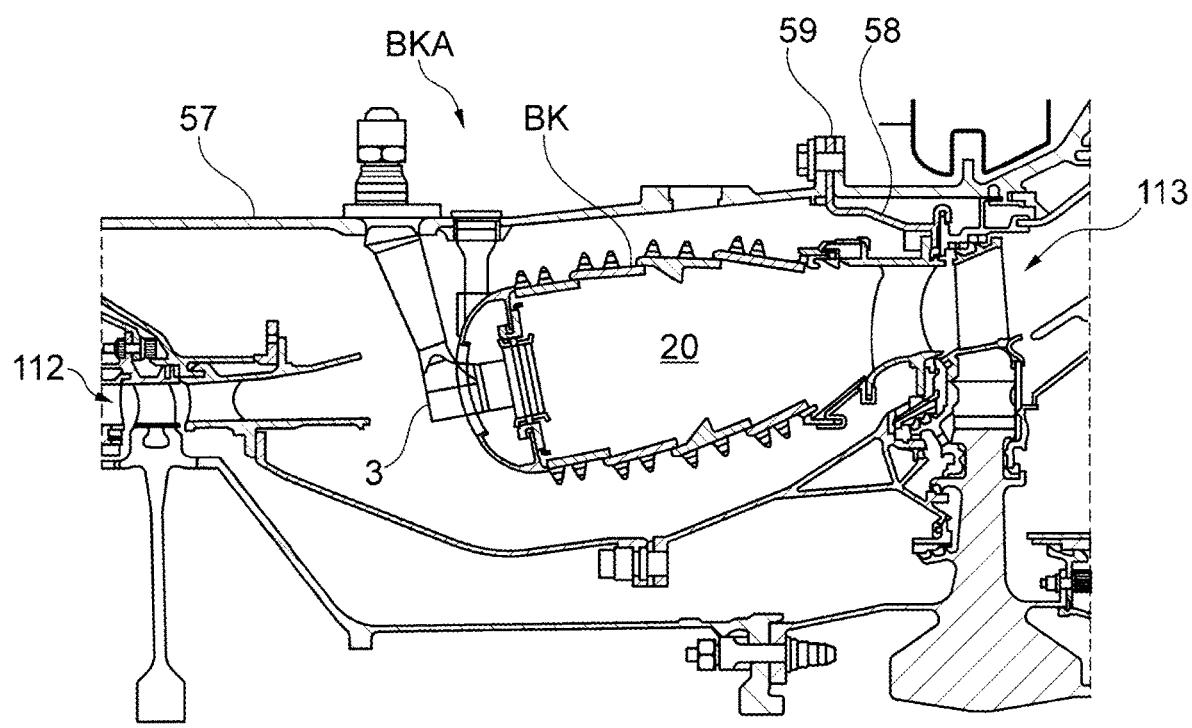
FIG. 11B shows, in an excerpt and on an enlarged scale, the combustion chamber of the engine of FIG. 11A.

FIG. 11B shows a longitudinal section through the combustion chamber section BKA of the engine T. This shows in particular an (annular) combustion chamber BK of the engine T. A nozzle assembly is provided for the injection of fuel or an air-fuel mixture into a combustion space 20 of the combustion chamber BK. Said nozzle assembly comprises a combustion chamber ring, on which multiple fuel nozzles 3 are arranged along a circular line around the central axis M. Here, on the combustion chamber ring, there are provided the nozzle outlet openings of the respective fuel nozzles 3 which are situated within the combustion chamber BK. Here, each fuel nozzle 3 comprises a flange by means of which a fuel nozzle 3 is screwed to an outer housing 57 of the combustion chamber section BKA. The illustrated combustion chamber BK is in this case for example a (fully) annular combustion chamber such as is used in gas turbine engines. Via an arm 58 and a flange 59, an (outer) combustion chamber wall 21 of the combustion chamber BK is connected to the outer housing 57.

Figure 1:
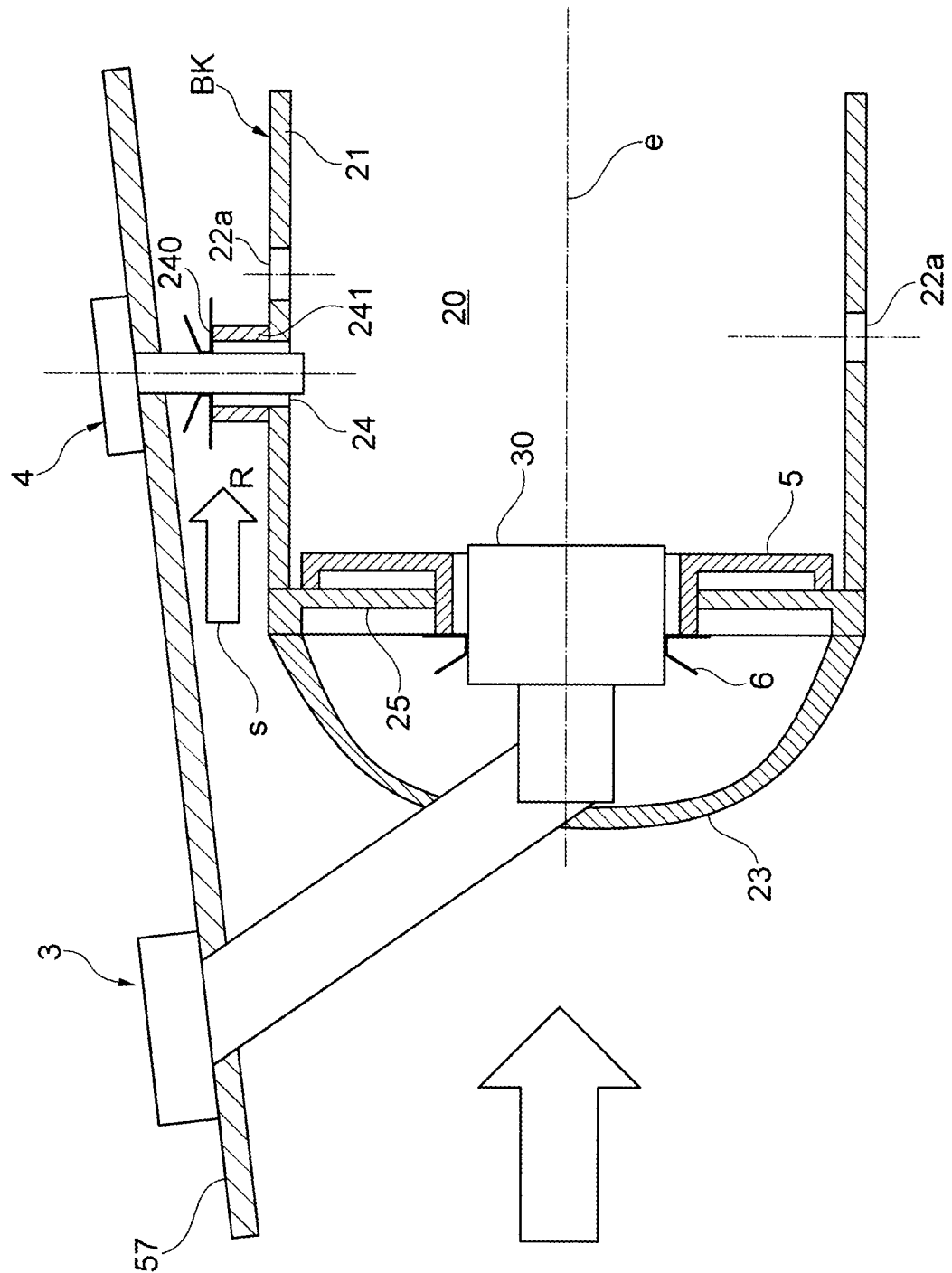
FIG. 1 shows, as an excerpt and in longitudinal section, a combustion chamber assembly in the region of a spark plug which projects into a combustion space of a combustion chamber and is fixed to a combustion chamber wall of the combustion chamber via a sealed spark-plug tower.

FIG. 1 shows the combustion chamber BK in longitudinal section with a variant embodiment of a proposed combustion chamber assembly.

The combustion chamber wall 21 of the combustion chamber BK of FIG. 1 bounds a combustion space 20, into which the fuel nozzle 3 can inject a fuel-air mixture via a nozzle head 30. The nozzle head 30 of the fuel nozzle 3 is held here in a manner known per se in a passage opening in an end-side base plate 25 of the combustion chamber BK via a burner seal 6. The base plate 25 is protectively covered by a heat shield 5 toward the combustion space 20.

Downstream of the base plate 25, a cover 23 is provided on the combustion chamber head of the combustion chamber BK. Beyond said cover 23, an air flow or approach flow s flows radially inward and outward and is accordingly guided along the combustion chamber wall 21 on the radially inner and radially outer side of the combustion chamber BK. By this means, mixing air flows along the combustion chamber wall 21 in a flow direction R to mixing air holes 22a arranged in defined patterns on the combustion chamber wall 21. Mixing air necessary for the combustion enters the combustion space 20 via said mixing air holes 22a.

Substantially transversely with respect to a longitudinal axis e defined by the nozzle head 30 and extending through the combustion space 20, in the case of a combustion chamber assembly of FIG. 1, at least one spark plug 4 is provided projecting into the combustion space 20. Typically, a plurality of spark plugs 4 (at least two) are distributed on the circumference of the combustion chamber wall 21 in order to ignite the fuel-air mixture within the combustion space 20. In the variant embodiment of FIG. 1, a spark plug 4 which is illustrated is provided on a spark-plug tower 241, which protrudes on the outer side, of the combustion chamber wall 21. The spark plug 4 extends via said spark-plug tower 241 through an access hole 24 formed in the combustion chamber wall 21 into the combustion space 20. The access hole 24 is sealed here in the region of the spark-plug tower 241 via an additional seal 240.

By means of the sealed spark-plug tower 241, the air flow s along the flow direction R running substantially parallel to the longitudinal axis e is at least partially blocked locally. A smaller quantity of mixing air therefore arrives at mixing air holes 22a lying downstream, and therefore behind the spark plug 4 and its spark-plug tower 240 with respect to the flow direction R. The spark-plug tower 241 therefore leads to a deterioration in the air supply to the mixing air holes 22a lying downstream. The corresponding sectors of the combustion chamber BK are therefore even hotter at the exit than the other sectors and a corresponding increased temperature has to be taken into consideration in the design of the turbine cooling.

Figure 2:
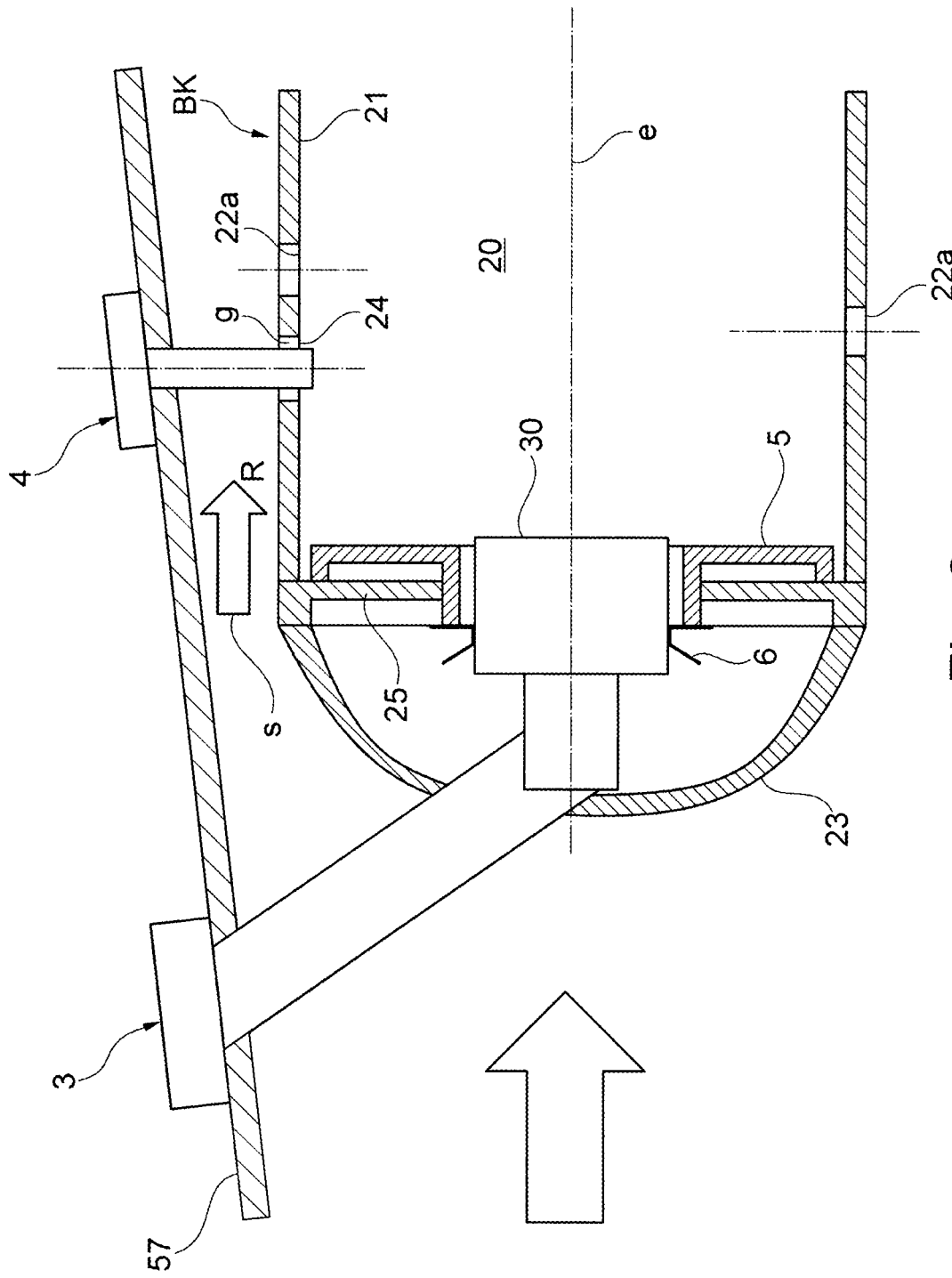
FIG. 2 shows, in a view corresponding to FIG. 1, an alternative variant embodiment of a combustion chamber assembly with a spark plug which projects through an access hole into the combustion space at which there is a leakage.

By contrast, in a modified variant embodiment according to FIG. 2, the spark plug 4 projects into the combustion space 20 via a non-sealed access hole 24. A leakage gap g is formed here between an inner lateral surface of the access hole 24 and the outer circumference of the spark plug 4. Via said typically annular leakage gap g an additional supply of mixing air arises in the sector of the combustion chamber BK that is provided with the spark plug 4. The corresponding sector of the combustion chamber BK that is provided with the spark plug 4 is therefore colder at the end of the combustion chamber BK than the other sectors. By this means, the fuel-air mixture in the region of the spark plug 4 is leaner than in the region of other sectors of the combustion chamber BK, and a flame arising here has less stability under some circumstances.

Figure 3:
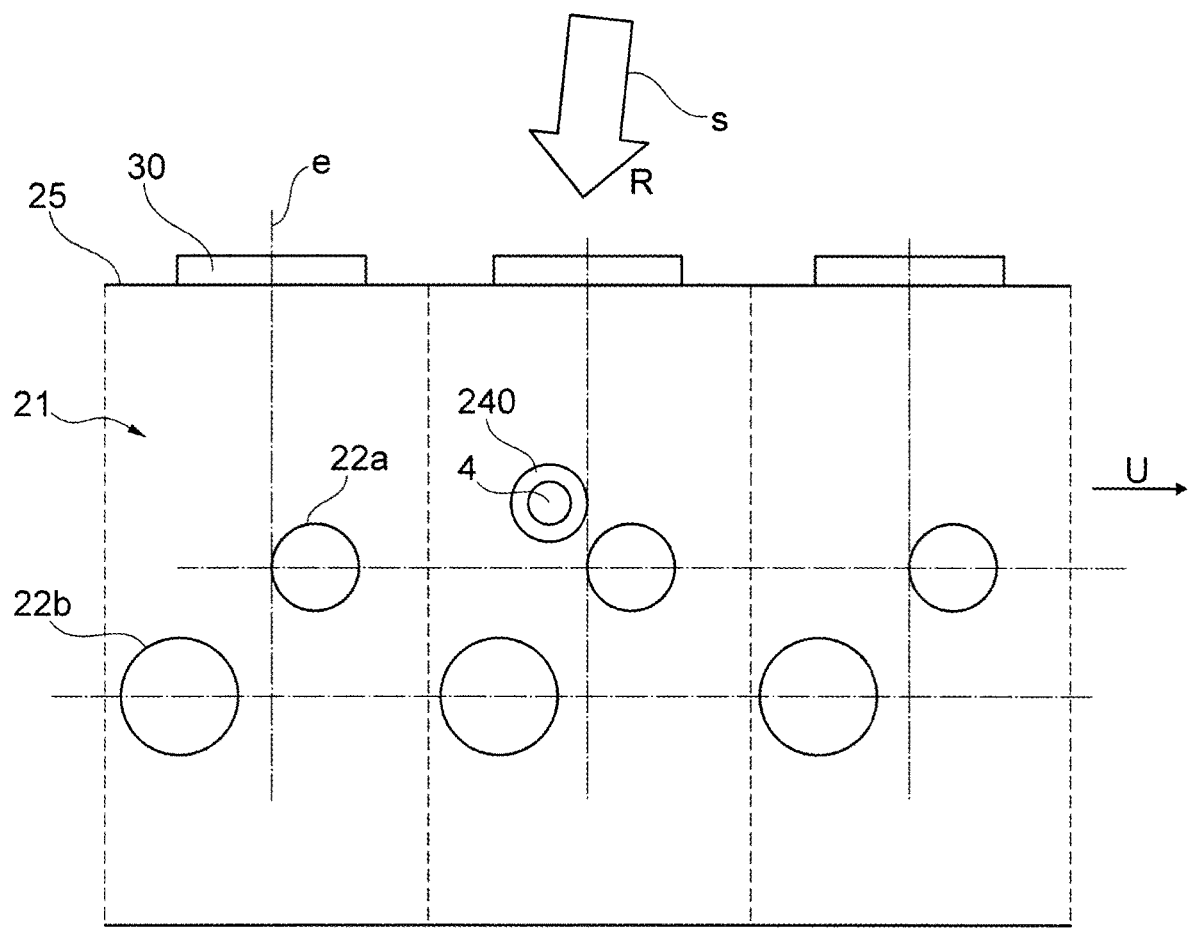
FIG. 3 shows, as an excerpt and looking at an outer side of the combustion chamber wall, a design, known from the prior art, of mixing air holes on the combustion chamber wall of FIG. 1.
Figure 4:
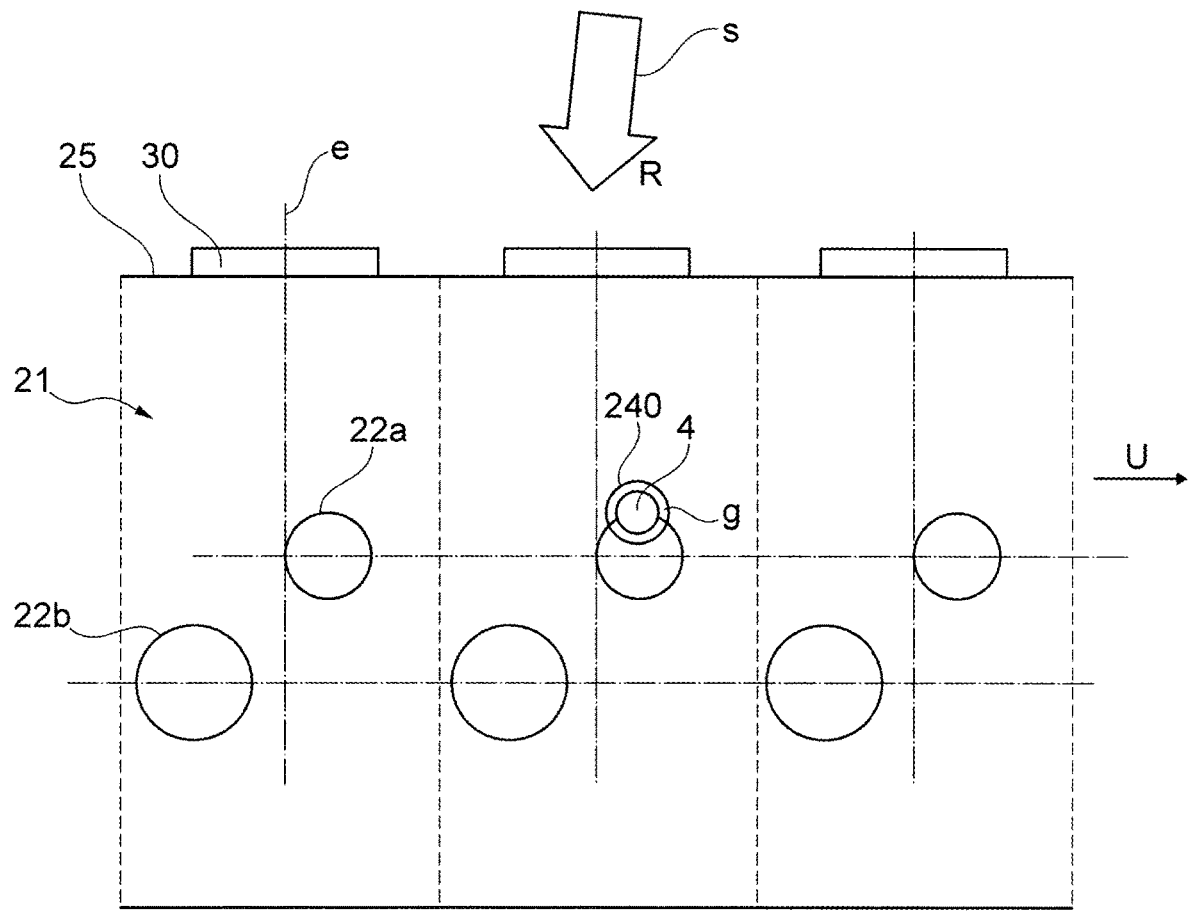
FIG. 4 shows, as an excerpt and looking at an outer side of the combustion chamber wall, a design, known from the prior art, of mixing air holes on the combustion chamber wall of FIG. 2.

In the case of a combustion chamber assembly which is known from the prior art and corresponds to FIGS. 3 and 4, generally no remedy is provided in this regard. Arrangements of mixing air holes 22a and 22b following one another in the flow direction R, here in the form of rows of mixing air holes 22a and 22b following one another in the circumferential direction U and having different flow cross sections are indeed provided here. However, the flow cross sections of an arrangement, here row, are in each case uniform. In the variant embodiments of FIGS. 3 and 4, for example, mixing air holes 22a of a first row which is provided downstream of the spark plugs 4 are formed with a smaller flow cross section than mixing air holes 22b of a second row following downstream and therefore in the flow direction R, specifically independently of whether the spark plug 4 is provided at a sealed access hole 24 according to FIG. 3 or at an access hole 24 having a leakage gap g according to FIG. 4.

By contrast, it is provided, within the scope of the proposed solution, that mixing air holes located in the overrun of the spark plug 4 are changed specifically in their flow cross section in relation to mixing air holes of the same arrangement, for example of the same row running in the circumferential direction. It is thereby possible to avoid, for example, that a spark-plug position is visible in the temperature profile at the end of the combustion chamber. This leads to a lower use of cooling air. Furthermore, a fuel-air ratio in all of the sectors of the combustion chamber BK with and without a spark plug 4 is (very substantially) identical at the end.

For this purpose, it has proven advantageous that an overrun of the spark plug 4 or a partial region of said overrun, in which mixing air holes to be adapted in respect of their flow cross section have to be provided, is defined specifically via an outer cone and an inner cone.

An outer cone 40a (co-)defining the overrun of the spark plug 4, as proposed, is predetermined in a cross-sectional view parallel to the flow direction R and through the access hole 24 for the spark plug 4 by two outer edges 401a, 402a which intersect at an outer apex point Sa of the outer cone 40a upstream of the spark plug 4, in each case run at an angle $\varphi$ of 10° (and therefore in a range of 8° to 12°) to the flow direction R and are at a tangent to an outer circumference of the spark plugs 4 at a contact point P1 or P2. The circumference of the spark plugs 4 therefore (completely) lies between the two outer edges 401a and 402a which extend in a radiant manner in the cross-sectional view away from the outer apex point Sa positioned upstream and which, at the apex point Sa, enclose a double cone angle $\alpha$ of $2\varphi$.

Figure 5:
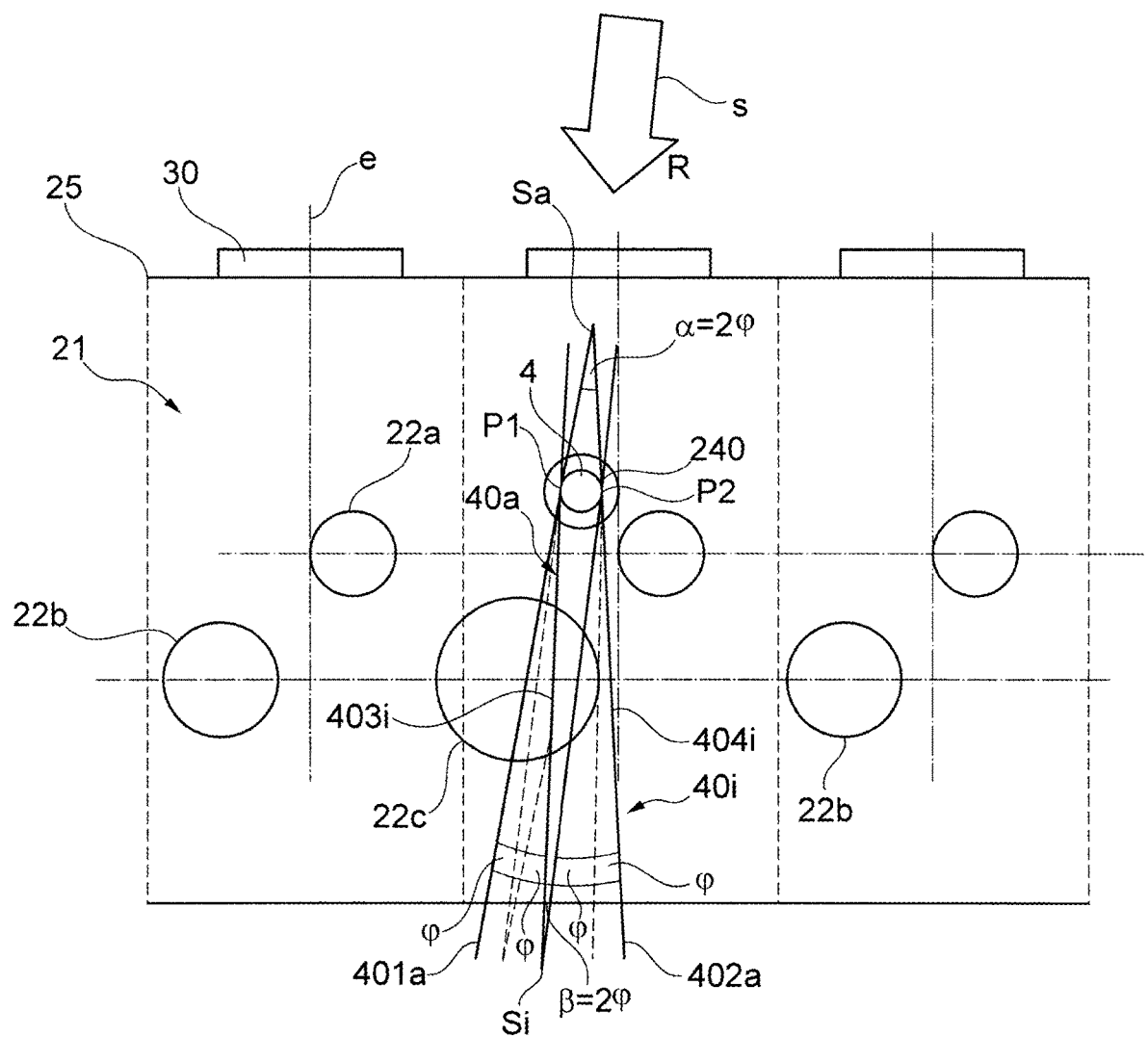
FIG. 5 shows, as an excerpt and looking at the outer side of the combustion chamber wall, a design of the mixing air holes in the combustion chamber assembly of FIG. 1 corresponding to the proposed solution with an illustration of a cross-sectional view of outer and inner cones defining an overrun of the spark plug.

In addition to the outer cone, for the definition of the overrun, an inner cone is predetermined in the same cross section according to FIG. 5 by two inner edges 403i, 404i which intersect at an inner apex point Si of the inner cone 40i upstream of the spark plug 4, in each case run at an identical (overrun) angle $\varphi$ of 10° to the flow direction R and are at a tangent to an outer circumference of the spark plugs 4 at the same two contact points P1 and P2 as the outer edges 401a and 402a of the outer cone 40a. The corresponding inner cone 40i therefore opens in the opposite direction to the flow direction R and has two inner edges 403i and 404i which extend radiantly away from the inner apex point Si and, at the inner apex point Si, enclose a double cone angle $\beta$ of likewise $2\varphi$.

The two V shapes which intersect at the contact points P1 and P2 on the outer circumference of the spark plug 4, are rotated by 180° with respect to each other and are formed by the outer and inner edges 401a, 402a and 403i, 404i therefore define, in the cross-sectional view, a parallelogram with the two contact points P1 and P2 and the inner and outer apex points Si and Sa as corner points of the parallelogram, in the center of which the circumferential line of the spark plug 4 (completely) lies. This parallelogram is emphasized in FIG. 7A.

A partial region of the overrun of the spark plug 4, in which mixing air holes which are to be changed in their flow cross section have to at least partially lie, is now defined by the part, which lies downstream of the spark plug 4, of the overrun which is defined by the outer cone 40a and by the inner cone 40i and extends as far as the inner apex point Si. In the design of the mixing air holes on the combustion chamber wall 21, said cross-sectionally substantially trapezoidal partial region of the overrun defined by the inner cone 40i and the outer cone 40a therefore predetermines which mixing air holes have to be adapted in their cross section. An increase of the flow cross section can be provided here if there is a local blockade of the approach flow s in the region of the spark plug 4 because of a sealed access hole 24 with a spark-plug tower 241. Alternatively, a reduction of the flow cross section can be provided if there is a leakage gap g in the region of the access hole 24.

Figure 6:
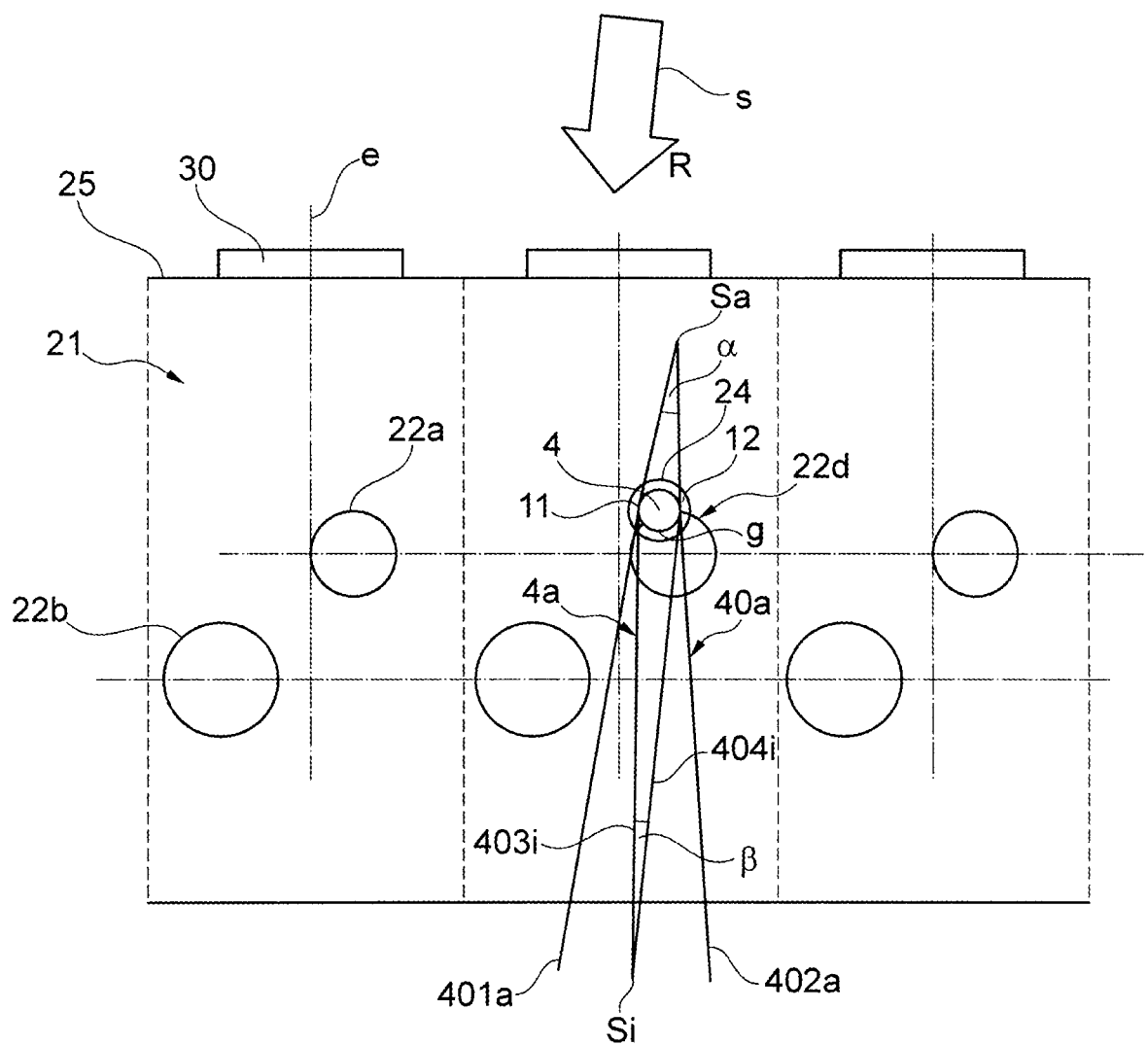
FIG. 6 shows, as an excerpt and looking at the outer side of the combustion chamber wall, a design of the mixing air holes in the combustion chamber assembly of FIG. 2 corresponding to the proposed solution with an illustration of a cross-sectional view of outer and inner cones defining an overrun of the spark plug.

Accordingly, for example in the variant embodiment of FIG. 5 with sealed access hole 24, a mixing air hole 22c, which is swept over by the overrun of the spark plug 4, of the second row of mixing air holes lying downstream in the flow direction R is formed with a larger flow cross section. By contrast, in the variant embodiment of FIG. 6, a mixing air hole 22d, which is present in the overrun, defined as proposed, of the spark plug 4, of the first row of mixing air holes is formed with a smaller flow cross section. The respective mixing air hole 22c or 22d is adapted in its diameter in this case while maintaining the hole center point, wherein a possibly present residual swirl in the approach flow s is sufficiently taken into consideration by the selected (overrun) angle φ for the projection of the overrun of the spark plugs 4.

Figure 7A:
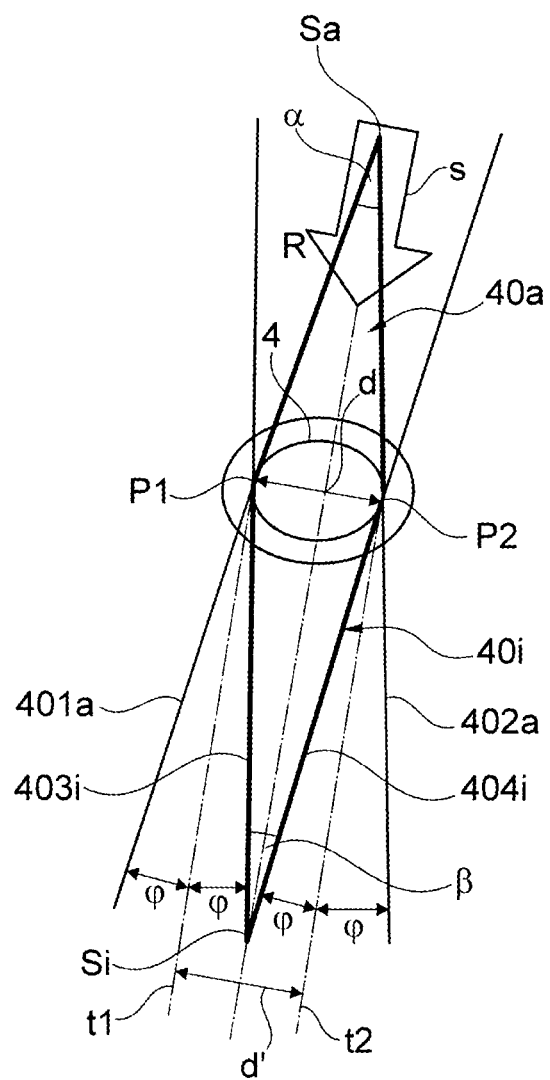
FIG. 7A shows, in an enlarged individual illustration and in cross section, the outer and inner cones defining the overrun of the spark plug, in particular with an illustration of the overrun angle predetermined for this purpose.

The proposed definition of the overrun of a spark plug 4 that is decisive for the adaptation of a flow cross section of a mixing air hole is illustrated once again in more detail with reference to the enlarged illustration of FIG. 7A. The (overrun) angle φ between an outer or inner edge 401a, 402a or 403i, 404i and the flow direction R is additionally illustrated here by tangents t1 and t2, which run parallel to the flow direction R, at the contact points P1 and P2 of the circumference of the spark plug 4. Said tangents t1 and t2 are consequently spaced apart from each other in a projected diameter d' which corresponds to a diameter d of the spark plug 4 in the access hole 24.

The degree of the variation of the flow cross sections of a mixing air hole 22c or 22d over which the overrun of the spark plug 4 sweeps depends here in particular on whether the respective mixing air hole 22c, 22d is (also) intersected, and consequently swept over, by the inner cone 40i or only by the outer cone 40a and whether a plurality of mixing air holes 22c, 22d lie at least partially in the correspondingly defined overrun of the spark plug 4. If at least one mixing air hole is swept over by the core region and therefore by the inner cone 40i, then between 50% to 100%, for example in particular 75% to 100%, of the local flow reduction or the leakage into the combustion space 20 is compensated for at said mixing air hole. If at least one mixing air hole is swept over by the outer region of the overrun and therefore by the outer cone 40a, then between 10% to 50%, for example in particular 33% to 50%, of the spark-plug-induced mixing air reduction or the spark-plug-induced mixing air excess is compensated for at said mixing air hole. If at least one mixing air hole is swept over by the core region and at least one mixing air hole is swept over by the edge region of the overrun, then between 50% to 75%, including 60% to 70%, of the mixing air reduction or of the mixing air excess is compensated for at the at least one mixing air hole in the core region of the overrun, and between 10% to 50%, including 25% to 40%, is compensated for at the at least one mixing air hole in the edge region of the overrun. The total of the two compensating measures is here between 75% to 100% and lies, for example, in the range of 90% to 100%. Mixing air holes 22a and 22b outside the overrun of the spark plug 4 remain unchanged.

When a spark plug is provided in a sealed access hole 24, a flow cross section of at least one mixing air hole 22c present in the partial region of the overrun is consequently increased in such a manner that, by means of the increased flow cross section, it is possible to compensate for the above percentages of a quantity of mixing air by which a mixing air flow is reduced in the region of the sealed access hole 24 in relation to regions of the combustion chamber wall 21 adjoining in the circumferential direction without a spark plug 4 (and without a spark-plug tower 241). By contrast, when a spark plug 4 is provided with a the leakage gap g in an access hole 24, a flow cross section of at least one mixing air hole 22d present at least partially in the partial region of the overrun is reduced in such a manner that, by means of the reduced flow cross section, it is possible to compensate for the above percentages of a quantity of mixing air which flows excessively through the leakage gap g and therefore additionally into the combustion space 20.

Figure 7B:
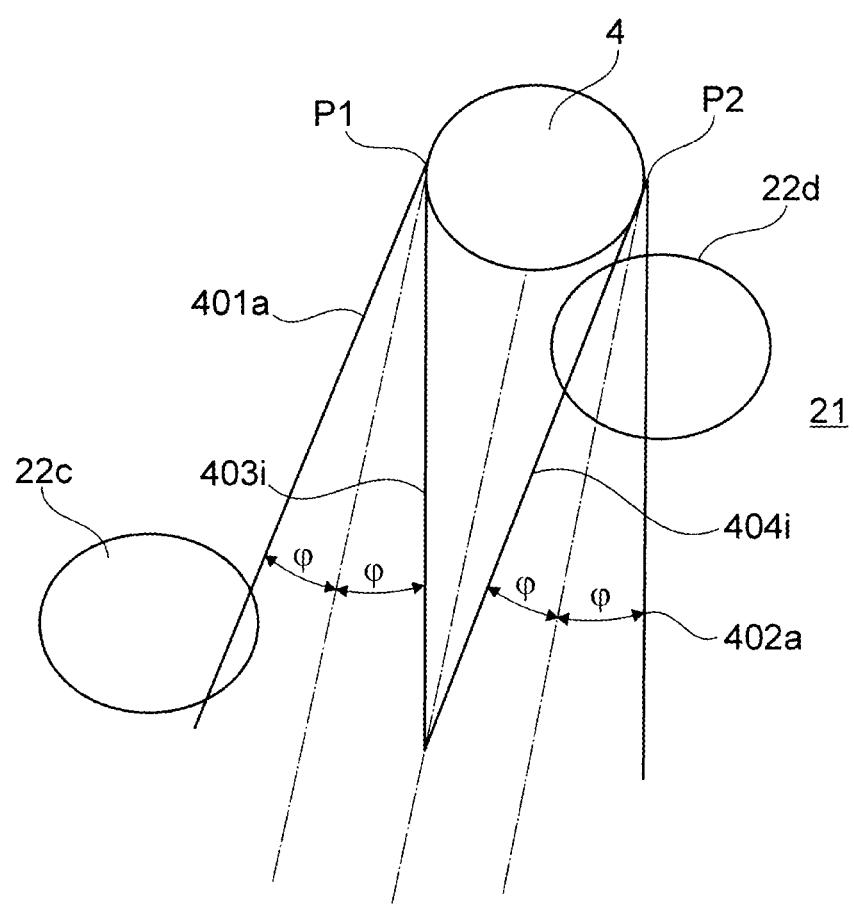
FIG. 7B shows, in excerpt, a combustion chamber wall with two mixing air holes which are present in the overrun of the spark plug and the flow cross sections of which are modified in relation to adjacent mixing air holes.

The enlarged illustration of FIG. 7B illustrates a development of a combustion chamber assembly according to the proposed solution, in which two mixing air holes 22c and 22d of rows of mixing air holes provided further downstream of the spark plug 4 are present in the partial region of the overrun of the spark plug 4 that is defined by the inner cone 40i and the outer cone 40a. While a first mixing air hole 22d, which is present downstream of the spark plug 4, of the first row of mixing air holes is intersected by the inner cone 40i and therefore by an inner edge 404i, the other, further downstream mixing air hole 22c of the second row of mixing air holes is intersected, in cross-sectional view, merely by the outer cone 40a and, in this connection, by an outer edge 401a. Accordingly, the flow cross section of the mixing air hole 22d lying in the core region of the overrun is larger (when the access hole 24 is sealed) or smaller (in the case of an access hole 24 with a leakage gap g) than the flow cross section of the mixing air hole 22c lying in the outer region of the overrun.

Figure 8:
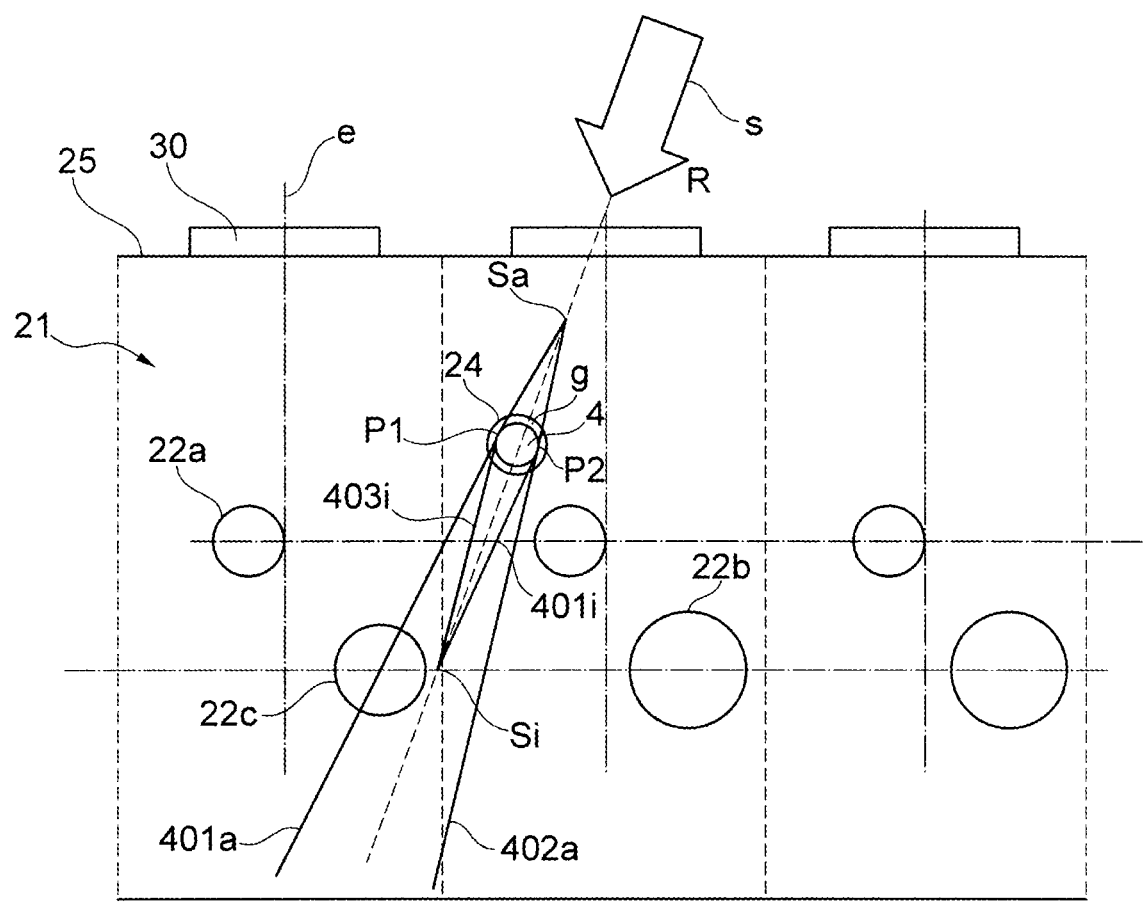
FIG. 8 shows, in a view corresponding to FIG. 6, an alternative, on the basis of the variant embodiment of FIG. 6, to the configuration of a combustion chamber assembly according to the proposed solution, in which a mixing air hole present in the overrun further downstream of the spark plug is modified in respect of its flow cross section.

As is illustrated in particular with reference to the development of FIG. 8, the effect achieved by the proposed definition of the overrun depending on the flow direction R of the optionally swirl-affected approach flow s is that the center point of a mixing air hole 22c or 22d to be adapted in respect of its flow cross section does not have to lie with its center point in the respective region of the overrun. In the event of a strong residual swirl (e.g. circa 30° with respect to a longitudinal direction running parallel to the longitudinal direction e), of a long combustion chamber BK or a spark plug 4 not sitting on the burner axis, or for other reasons, the overrun of the spark plug 4 can leave the burner sector in which the spark plug 4 is installed, and can also sweep over a mixing air hole 22c in an adjacent burner sector. Consequently, by definition, a mixing air hole 22c which lies in a burner sector adjacent to the burner sector with the spark plug 4 (as is the case in FIG. 8) can also be changed in respect of its flow cross section on the basis of a flow direction s taking into consideration the residual swirl. The proposed adaptation of a flow cross section and therefore typically of a diameter of a mixing air hole 22c or 22d is accordingly based specifically not on the association of a mixing air hole with the burner sector with the spark plug 4, but rather on which mixing air hole 22c or 22d is swept over by the overrun of the spark plug 4 that is defined, as proposed, in particular on the basis of the flow direction s at the spark plug 4. By this means, the adaptation then also takes place independently of to which burner sector the respective mixing air hole 22c or 22d belongs.

The solution proposed here therefore improves the cooling air design of an engine and permits an effective equalization of the fuel-air ratio over all sectors of the combustion chamber BK with and without spark plugs 4. In practice, no additional structural outlay is necessary here either since, for example, the shingling in a burner sector with a spark plug 4 should always be defined differently because of the access hole 24 to be additionally provided for a spark plug 4. Shingled combustion chambers already nowadays need a special combustion chamber shingle with a passage for the spark plug 4. Such a combustion chamber shingle should therefore merely at most be configured differently. However, an additional component is unnecessary.

Figure 9:
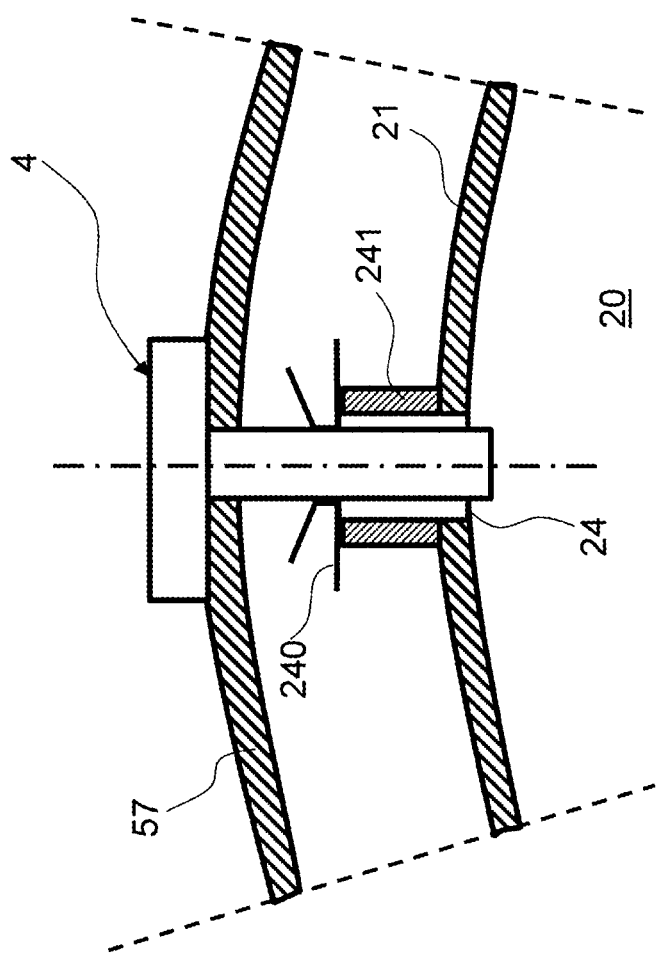
FIG. 9 shows, in an excerpt looking along a longitudinal axis of the combustion chamber, a burner sector with a spark plug according to FIG. 1 present on the combustion chamber wall and provided on a spark-plug tower.

FIG. 9 shows, in an excerpt looking along the longitudinal axis e of the combustion chamber BK, a burner sector with the spark plug 4 present on the combustion chamber wall 21 and provided sealed on the spark-plug tower 241. The compensation effects already explained above will be explained once again in more detail once again here. In the event of blocking of the flow (and therefore blocking in the outer annulus of the combustion chamber BK) by the spark plug 4 present in the sealed access hole 24 and the spark-plug tower 241, full compensation is understood as meaning that compensation at which the at least one mixing air hole 22a-22d in the overrun of the spark plug 4 is increased in size by the portion of the cross-sectional area that corresponds to the portion of the cross-sectional area of spark plug 4 and spark-plug tower 241 or seal 240 at the entire area of the outer annulus between combustion chamber BK and housing 57 accommodating the combustion chamber BK in a burner sector.

As already explained above, in the case of a mixing air hole present in an edge region of the overrun, a smaller compensation in terms of percentage is provided than in the case of a mixing air hole which at least partially lies in a core region of the overrun. The strength of the negative effect of the overrun of the spark plug 4 therefore decreases slowly at an increasing axial distance (in the flow direction with residual swirl) from the spark plug 4 and decreases quite rapidly perpendicularly thereto (in the circumferential direction U, if without residual swirl). The flow introduced through the spark plug 4 and its spark-plug tower 241 can also be understood here as meaning the local deficit in the total pressure of the flow in the outer annulus. The difference of the total pressure in the annulus to the static pressure in the combustion chamber BK constitutes the driving pressure gradient for the flow through the mixing air holes 22a-22d. The outer cone 40a is the region in which a disturbance is generally present, but states little about the strength of said disturbance. The inner cone 40i with a limited axial extent (in the flow direction s) is the region of the disturbance in which the latter maintains its strength constantly. Only after the end of the core region of the overrun is the deficit thereof in the total pressure topped up again and therefore the total pressure increases on the axis of the overrun as the running length increases. FIGS. 10A and 10B illustrate corresponding total pressure profiles $p1(x)$, $p2(x)$ and $p3(x)$ in the overrun of the spark plug 4 at three different points which are defined by intersecting planes A-A, B-B and C-C. For all three total pressure profiles $p1(x)$, $p2(x)$ and $p3(x)$, the local minimum in the core region of the inner cone 40i can readily be seen as can the total pressure deficit which decreases outward in the circumferential direction.

LIST OF REFERENCE SIGNS

111 Low-pressure compressor
112 High-pressure compressor
113 High-pressure turbine
114 Medium-pressure turbine
115 Low-pressure turbine
20 Combustion space
21 Combustion chamber wall
22a, 22b Mixing air hole
22c, 22d (Modified) mixing air hole
23 Cover
24 Access hole
240 Seal
241 Spark-plug tower
25 Base plate
3 Fuel nozzle
30 Nozzle head
4 Spark plug
401a, 402a Outer edge
403i, 404i Inner edge
40a Outer cone
40i Inner cone
5 Heat shield
57 Outer housing
58 Arm
59 Flange
6 Burner seal
d, d' Diameter
E Inlet/Intake
E Longitudinal axis
F Fan
F1, F2 Fluid flow
FC Fan housing
G Leakage gap
L Longitudinal axis
M Central axis/axis of rotation
R Flow direction
S Rotor shaft
S Approach flow/air flow
Sa Outer apex point
Si Inner apex point
T (Turbofan) engine
t1, t2 Tangent
TT Turbine
U Circumferential direction
V Compressor
α, β Double cone angle
φ (Overrun) angle

The invention claimed is:

1. A combustion chamber assembly of an engine, comprising:
a combustion chamber including a combustion chamber wall which bounds a combustion space, a plurality of mixing air holes for supplying mixing air into the combustion space positioned on the combustion chamber wall, and an access hole positioned on the combustion chamber wall, and
a spark plug fixed at the access hole and projecting through the access hole into the combustion space,
wherein, during operation of the engine, an air flow flows along the combustion chamber wall in a flow direction toward the mixing air holes, with at least a part of at least one of the mixing air holes being positioned downstream of the access hole in the flow direction, and
wherein the mixing air holes include a first arrangement of mixing air holes lying next to one another in a circumferential direction and a second arrangement of mixing air holes lying next to one another in the circumferential direction, the second arrangement being positioned downstream of the first arrangement with respect to the flow direction,
wherein an overrun of the spark plug is defined with an outer cone and an inner cone, wherein
the outer cone is established in a cross section parallel to the flow direction and through the access hole by two outer edges which intersect at an outer apex point of the outer cone upstream of the spark plug, each of the two outer edges running at a first angle in a range of 8° to 12° to the flow direction, the two outer edges being tangent to an outer circumference of the spark plug at two respective contact points, and the inner cone is established in the cross section by two inner edges which intersect at an inner apex point of the inner cone downstream of the spark plug, each of the two inner edges running at a second angle in a range of 8° to 12° to the flow direction, the two inner edges also being tangent to the outer circumference of the spark plug at the two respective contact points, and mixing air holes of the first arrangement and the second arrangement that lie at least partially in a partial region of the overrun of the spark plug, the overrun defined by the outer cone and the inner cone extending downstream of the spark plug as far as the inner apex point, are formed with at least one overrun flow cross section which is different from a non-overrun flow cross section of the mixing air holes adjacent in the circumferential direction of the respective arrangement;

wherein, there is a leakage gap between an inner lateral surface of the access hole and the spark plug and the at least one overrun flow cross section is adjusted to compensate for the leakage gap;

wherein, the at least one overrun flow cross section is reduced to compensate for between 10% and 100% of a quantity of mixing air which flows through the leakage gap into the combustion space.

2. The combustion chamber assembly according to claim 1, wherein the at least one overrun flow cross section includes a first flow cross section of a mixing air hole which is intersected by at least one inner edge of the inner cone and a second flow cross section of a mixing air hole which is intersected by at least one outer edge of the outer cone of the overrun and the first flow cross section is smaller than the second flow cross section.

3. The combustion chamber assembly according to claim 1, wherein the at least one overrun flow cross section includes a first flow cross section of a mixing air hole which is intersected by at least one inner edge of the inner cone that has a reduced flow cross section to compensate for between 50% and 100% of a quantity of mixing air which flows through the leakage gap into the combustion space.

4. The combustion chamber assembly according to claim 1, wherein the at least one overrun flow cross section includes a second flow cross section of a mixing air hole which is intersected by at least one outer edge of the outer cone that has a reduced flow cross section to compensate for between 10% and 50% of a quantity of mixing air which flows through the leakage gap into the combustion space.

5. The combustion chamber assembly according to claim 1, wherein the at least one overrun flow cross section includes a first flow cross section of a first mixing air hole which is intersected by at least one inner edge of the inner cone of the overrun and a second flow cross section of a second mixing air hole which is intersected only by at least one outer edge of the outer cone of the overrun, and the first and second flow cross sections differ.

6. The combustion chamber assembly according to claim 1, wherein, the at least one overrun flow cross section includes flow cross sections of first and second mixing air holes that are reduced to compensate for in total between 75% and 100% of a quantity of mixing air which flows through the leakage gap into the combustion space.

7. The combustion chamber assembly according to claim 6, wherein, the reduced flow cross section of the first mixing air hole compensates for between 50% and 75% of the quantity of mixing air, and the reduced flow cross section of the second mixing air hole compensates for between 10% and 50% of the quantity of mixing air.

8. A gas turbine engine having the combustion chamber assembly according to claim 1.

9. The combustion chamber assembly according to claim 1, wherein the first angle is 10° and the second angle is 10°.

10. A method for producing a combustion chamber assembly of an engine, comprising providing a combustion chamber wall for a combustion chamber for bounding a combustion space of the combustion chamber and providing a plurality of mixing air holes on the combustion chamber wall supplying mixing air into the combustion space, and providing at least one access hole on the combustion chamber wall for a spark plug which is fixed at the access hole and which projects through the access hole into the combustion space, providing that, during the operation of the engine, an air flow flows along the combustion chamber wall in a flow direction toward the mixing air holes, with at least a part of at least one of the mixing air holes being positioned downstream of the access hole in the flow direction, and providing that the mixing air holes include a first arrangement of mixing air holes lying next to one another in a circumferential direction and a second arrangement of mixing air holes lying next to one another in the circumferential direction, the second arrangement being positioned downstream of the first arrangement with respect to the flow direction, providing that an overrun of the spark plug is defined with an outer cone and an inner cone, wherein the outer cone is established in a cross section parallel to the flow direction and through the access hole by two outer edges which intersect at an outer apex point of the outer cone upstream of the spark plug, each of the two outer edges running at a first angle in a range of 8° to 12° to the flow direction, the two outer edges being tangent to an outer circumference of the spark plug at two respective contact points, and the inner cone is established in the cross section by two inner edges which intersect at an inner apex point of the inner cone downstream of the spark plug, each of the two inner edges running at a second angle in a range of 8° to 12° to the flow direction, the two inner edges also being tangent to the outer circumference of the spark plug at the two respective contact points, and mixing air holes of the first arrangement and the second arrangement that lie at least partially in a partial region of the overrun of the spark plug, the overrun defined by the outer cone and the inner cone extending downstream of the spark plug as far as the inner apex point, are formed with at least one overrun flow cross section which is different from a non-overrun flow cross section of the mixing air holes adjacent in the circumferential direction of the respective arrangement;

wherein, there is a leakage gap between an inner lateral surface of the access hole and the spark plug and the at least one overrun flow cross section is adjusted to compensate for the leakage gap;

wherein, the at least one overrun flow cross section is reduced to compensate for between 10% and 100% of a quantity of mixing air which flows through the leakage gap into the combustion space.

11. The method according to claim 10, wherein the first angle is 10° and the second angle is 10°.

12. A combustion chamber assembly of an engine, comprising:
a combustion chamber including a combustion chamber wall which bounds a combustion space, a plurality of mixing air holes for supplying mixing air into the combustion space positioned on the combustion chamber wall, and an access hole positioned on the combustion chamber wall, and
a spark plug fixed at the access hole and projecting through the access hole into the combustion space,
wherein, during operation of the engine, an air flow flows along the combustion chamber wall in a flow direction toward the mixing air holes, with at least a part of at least one of the mixing air holes being positioned downstream of the access hole in the flow direction, and
wherein the mixing air holes include a first arrangement of mixing air holes lying next to one another in a circumferential direction and a second arrangement of mixing air holes lying next to one another in the circumferential direction, the second arrangement being positioned downstream of the first arrangement with respect to the flow direction,
wherein an overrun of the spark plug is defined with an outer cone and an inner cone, wherein
the outer cone is established in a cross section parallel to the flow direction and through the access hole by two outer edges which intersect at an outer apex point of the outer cone upstream of the spark plug, each of the two outer edges running at a first angle in a range of 8° to 12° to the flow direction, the two outer edges being tangent to an outer circumference of the spark plug at two respective contact points, and
the inner cone is established in the cross section by two inner edges which intersect at an inner apex point of the inner cone downstream of the spark plug, each of the two inner edges running at a second angle in a range of 8° to 12° to the flow direction, the two inner edges also being tangent to the outer circumference of the spark plug at the two respective contact points,
and mixing air holes of the first arrangement and the second arrangement that lie at least partially in a partial region of the overrun of the spark plug, the overrun defined by the outer cone and the inner cone extending downstream of the spark plug as far as the inner apex point, are formed with at least one overrun flow cross section which is reduced in relation to a non-overrun flow cross section of the mixing air holes adjacent in the circumferential direction of the respective arrangement.

13. A gas turbine engine having the combustion chamber assembly according to claim 12.

* * * * *